(12) United States Patent
Krieg et al.

(10) Patent No.: US 6,270,171 B1
(45) Date of Patent: Aug. 7, 2001

(54) AUTOMATIC BRAKING SYSTEM FOR MOTOR VEHICLES

(75) Inventors: Bernd Krieg, Birstein; Vladimir Dusil, Griesheim, both of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/194,857

(22) PCT Filed: Apr. 1, 1998

(86) PCT No.: PCT/EP98/01879

§ 371 Date: Mar. 18, 1999

§ 102(e) Date: Mar. 18, 1999

(87) PCT Pub. No.: WO98/43857

PCT Pub. Date: Oct. 8, 1998

(30) Foreign Application Priority Data

Apr. 3, 1997 (DE) .............................. 197 13 715

(51) Int. Cl.[7] .................................................. B60T 8/86
(52) U.S. Cl. ........................................ 303/125; 303/113.3
(58) Field of Search ........................... 303/113.2, 193, 303/196 A, 116.2, 113.3, 114.1, 116.1, 119.1, 11, DIG. 4, 125, 155, 166; 118/358

(56) References Cited

U.S. PATENT DOCUMENTS

| | | |
|---|---|---|
| 4,146,108 | 3/1979 | Sato . |
| 4,902,075 * | 2/1990 | Uno ........................................ 303/14 |
| 5,342,120 * | 8/1994 | Zimmer .............................. 303/113.2 |
| 5,797,663 * | 8/1998 | Kawaguchi .......................... 303/146 |

FOREIGN PATENT DOCUMENTS

| | | |
|---|---|---|
| 4440291 | of 0000 | (DE) . |
| 44 13 172 | 3/1995 | (DE) . |
| 4422664 | 3/1995 | (DE) . |
| 44 25 578 | 1/1996 | (DE) . |
| 19503622 | 8/1996 | (DE) . |
| 2174777 | 10/1973 | (FR) . |
| 2 250 070 | 5/1992 | (GB) . |
| 95 01 898 | 1/1995 | (WO) . |

OTHER PUBLICATIONS

Search Report of the German Patent Office for Application 19713715.6.

* cited by examiner

Primary Examiner—Christopher P. Schwartz
Assistant Examiner—C. T. Bartz
(74) Attorney, Agent, or Firm—Rader, Fishman & Grauer PLLC

(57) ABSTRACT

The invention discloses an automatic brake system for motor vehicles which serves to shorten the stopping distance by means of propulsion motor vehicle control signals while simultaneously lowering the required costs. According to the invention, means are provided which ensure pre-filling of the wheel brakes when a control signal which represents the motion of the gas pedal when the actuating force is discontinued is received by the brake system control unit.

27 Claims, 2 Drawing Sheets

AUTOMATIC BRAKING SYSTEM FOR MOTOR VEHICLES

TECHNICAL FIELD

The invention pertains to an automatic brake system for motor vehicles, with wheel brakes that are assigned to the wheels of the motor vehicle, and with an electronic control unit that receives at least one control signal from a device for detecting the discontinuation of an actuating force applied to the accelerator pedal, the foot throttle, or the twist grip throttle of the motor vehicle by the driver.

BACKGROUND OF THE INVENTION

A brake system of this type is, for example, known from European patent EP 0,706,466 B1. This known automatic brake system contains two sensors that are assigned to the gas pedal as well as a third sensor, wherein the output signals of all sensors are fed to an electronic control that automatically triggers the braking process. The first sensor which is assigned to the gas pedal and preferably realized in the form of a pressure sensor is arranged underneath the gas pedal. The second sensor delivers a signal when the foot of the driver is removed from the gas pedal. The third sensor is arranged between the gas pedal and the brake pedal and detects the movement of the driver's foot from the gas pedal toward the brake pedal. The disadvantages of this known brake system are the relatively high expenditure associated with the complex sensor arrangement as well as the risk of malfunctions, in particular, of the third sensor, e.g., due to soiling.

The present invention is based on the objective of disclosing an automatic brake system of the initially-mentioned type which makes it possible to shorten the stopping distance by means of propulsion-specific control signals of the motor vehicle, while simultaneously lowering the required costs. The functional reliability of the proposed brake system should be increased, and the scope of applications for said brake system should be broadened.

According to the invention, this objective is attained by providing means which ensure pre-filling of the wheel brakes when the sensor signal occurs. The term "pre-filling" which is conventionally used in brake engineering refers to an activation of the brake system that is connected in series with the wheel brakes, wherein the hydraulic pressure is increased in such a way that the brake linings merely adjoin the brake disk or brake drum while no deceleration of the motor vehicle takes place.

According to one embodiment of the invention, the control signal represents the load status of the motor vehicle engine or the motion of the gas pedal or the like which occurs when the actuating force is discontinued. It would also be conceivable to utilize the decrease in the engine speed as the control signal. However, this signal would be influenced by the inertia of masses of rotating and oscillating engine components, i.e., this signal would be more suitable as a fail-safe signal.

According to advantageous additional developments of the invention, the control signal may be generated by an electronic control device of a computer-controlled automatic transmission or represent a change in the pressure in the intake manifold of the engine or in the back pressure in the exhaust system. The engine vacuum is not subject to a significant delay threshold with respect to its response behavior, i.e., a sudden release of the gas pedal or the like can be rapidly and reliably detected, e.g., by means of a pressure switch.

According to another advantageous embodiment of the invention, it is proposed that the control signal be derived from performance characteristics stored in the electronic control device of a fuel injection system or from performance characteristics stored in the electronic control unit of an engine ignition system. In this case, particularly advantageous control signals are the fuel injection interrupt signal generated in motor vehicles with fuel cut-off in the overrun or a spark advance angle shift signal that, for example, can be used to realize "retarded ignition" during a sudden advance angle shift.

Naturally, the scope of the invention also allows additional embodiments, in which the control signal is triggered by a supercharger boost pressure sensor, a pressure sensor that preferably cooperates with the control unit of the engine ignition, or by a throttle sensor or switch that detects the adjustment of the throttle of the motor vehicle.

According to another alternative of the invention, it is proposed that the control signal be triggered by an idle switch that is assigned to a fuel injection pump.

According to one particularly advantageous additional development of the invention, the brake system be realized in the form of a hydraulic brake system, and the means for pre-filling the wheel brakes consist of a hydraulic pre-charging pump or a brake booster that can be controlled independently of the driver's intentions. In this case, the brake booster is preferably realized in the form of a vacuum brake booster, the control valve of which can be electromechanically actuated.

According to another advantageous characteristic of the invention, a second control signal is fed to the electronic control unit, wherein the second control signal is generated by a device for detecting when the foot or the hand of the driver come in contact with the brake pedal or the like, and wherein the pre-filling process is interrupted if no such signal occurs.

In this case, it is particularly advantageous if, according to another additional development of the invention, means are provided which measure the duration between the beginning of the pre-filling process and the reception of the second control signal, wherein the measured value is compared to a predetermined value.

In order to detect the driver's intentions with respect to an unintentional deceleration of the motor vehicle, the invention proposes to interrupt the pre-filling process if the predetermined value is exceeded.

In order to assist the driver, in particular, during so-called panic brake maneuvers, the invention proposes that full brake application take place if the predetermined value is not reached.

In this case, it is particularly advantageous if the electronic control unit is linked to an engine control device or to the electric switching circuits of an ABS/ARS control device. If the invention is correspondingly miniaturized, it can be integrated into the aforementioned control devices.

The invention is described in detail below with reference to one embodiment that is illustrated in the figures. In this respect, components that are not essential for the invention were omitted.

DETAILED DESCRIPTION OF THE PREFERRED EMBODIMENTS

Figure 1:
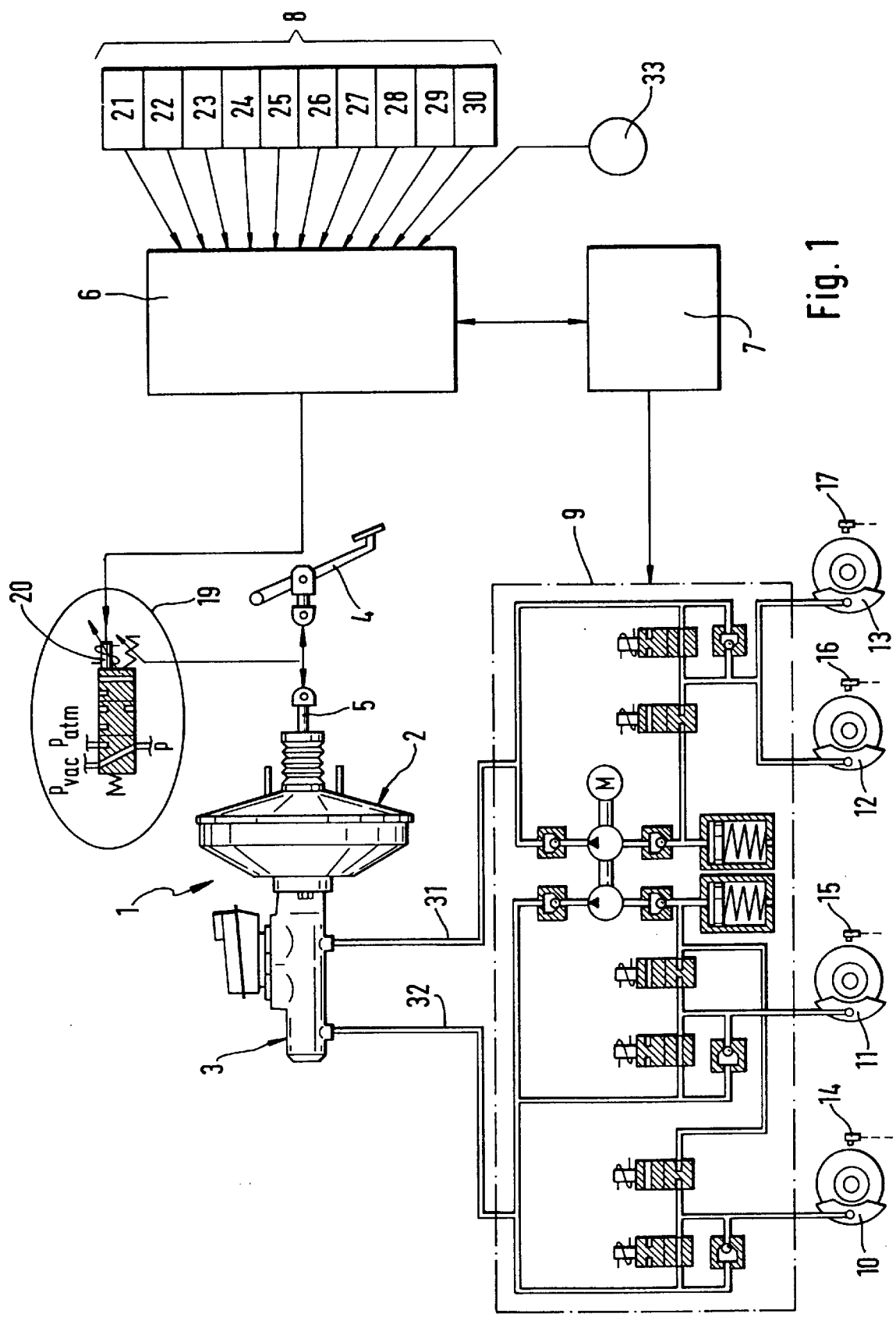
FIG. 1 is a schematic representation of the brake system according to the invention.

The automatic brake system according to the invention which is shown in FIG. 1 essentially consists of a hydraulic brake pressure source or an actuating unit 1, and, respectively, an electronic control unit 6, a device 8 for generating control signals that are fed to the electronic control unit 6, and wheel brakes 10–13 that are assigned to the individual wheels of a four-wheel motor vehicle and connected to the actuating unit 1.

A hydraulic unit or pressure modulator 9, which allows individual control of the hydraulic pressure fed to the wheel brakes 10–13 in response output signals from a regulator 7 that cooperates with the electronic control unit 6, is preferably arranged between the actuating unit 1 and the wheel brakes 10–13. However, in a preferred embodiment an electronic control unit 6 forms part of the regulator 7 or is integrated into said regulator. One wheel sensor 14, 15, 16, 17 is assigned, respectively, to each of the not-shown motor vehicle wheels, wherein the output signal of said wheel sensors which corresponds to the respective wheel speed is fed to the regulator 7. The actuating unit 1 consists of a pneumatic brake booster, preferably a vacuum brake booster 2, which is actuated by means of an actuating pedal 4 and connected in series to a main brake cylinder 3, preferably a tandem main cylinder. The not-shown pressure chambers of this main brake cylinder are connected to the pressure modulator 9 via hydraulic lines 31, 32. An actuating rod 5 for actuating a schematically-illustrated control valve 19 is coupled to the actuating pedal 4. The aforementioned control valve controls the build-up of a differential pneumatic pressure in the housing of the vacuum brake booster 2. In this case, an electromagnet 20 allows external actuation of the control valve 19.

FIG. 1 also shows that the device 8 for generating control signals may consist of several sensors or devices (signal transmitters) which measure the load status of the motor vehicle engine. The output signals of these sensors or signal transmitters may be processed in the electronic control unit 6 individually or in combined fashion. The reference symbol 21 identifies a first sensor that detects an adjustment of the throttle of the motor vehicle engine. The first sensor 21 is preferably realized in the form of a potentiometer that continuously measures the movement of the throttle and delivers an analog signal, or in the form of a digital throttle switch that senses at least the closed position of the throttle. A second sensor 22 delivers a signal that corresponds to the decrease in engine speed, wherein the second sensor is, for example, realized in the form of a crankshaft speed sensor. The reference symbols 23, 24, 25 and 26 identify pressure sensors that measure changes in the pressure in the intake manifold of the motor vehicle engine, the back pressure in the exhaust system of the motor vehicle engine, the boost pressure of a supercharged internal combustion engine, or the pneumatic pressure that influences an ignition control device, respectively. One additional signal transmitter 27 delivers a control signal that is triggered by the not-shown control device of a computer-controlled automatic transmission. The reference symbols 28 and 29 identify signal transmitters that make it possible to derive control signals from performance characteristics stored in a control device of the fuel injection system or a control device of the engine ignition system, respectively. In this case, the first signal transmitter 28 delivers a control signal that corresponds to the fuel injection interrupt signal, whereas the second signal transmitter 29 delivers a signal that represents an advance angle shift. However, it would also be conceivable to realize an embodiment of the invention in which the signal transmitter 28 is constituted from an idle switch assigned to a fuel injection pump. Consequently, the output signals of all aforementioned sensors or signal transmitters correspond to changes in the speed of the movement which occur when the actuating force acting on the gas pedal of the motor vehicle is discontinued.

The previous description clearly indicates that the brake system shown is realized in the form of a hydraulic brake system, wherein the pre-filling process of the wheel brakes 10–13 is carried out by external control of the vacuum brake booster 2 which depends on one or more of the aforementioned control signals. Naturally, the invention is not limited to the utilization of a vacuum brake booster 2. The scope of the invention also includes embodiments in which a hydraulic pump that is controlled by means of the electronic control unit or other suitable technical means, in particular, pressure generators with alternative actuators (servomotors or the like), are used for pre-filling the wheel brakes.

FIG. 1 also shows a device 30 that detects the time at which the driver's foot comes in contact with the actuating pedal 4 and generates an additional control signal that is fed to the electronic control unit 6. In this case, suitable software means ensuring that the pre-filling process is interrupted if the aforementioned control signal does not occur. The device 30 may, for example, consist of a generally known mechanical brake light switch that directly detects the movement of the actuating pedal 4 or a pressure sensor that is connected to one of the pressure chambers of the main brake cylinder 3 and senses the pedal actuation due to a pressure increase in the main brake cylinder 3.

In order to assist the driver, e.g., during so-called panic brake maneuvers, a time measuring element 33 is provided which measures the time elapsed between the beginning of the pre-filling process and the reception of the output signal of the device 30. The measured value is compared to a predetermined value stored in the electronic control unit 6, wherein a decision as to whether the pre-filling process should be interrupted or a rapid pressure increase for realizing full brake application should be initiated is made based on this comparison. The pre-filling process is interrupted if the measured duration exceeds the predetermined value, whereas the pressure increase or full brake application takes place if the duration is shorter than the predetermined value.

Figure 2:
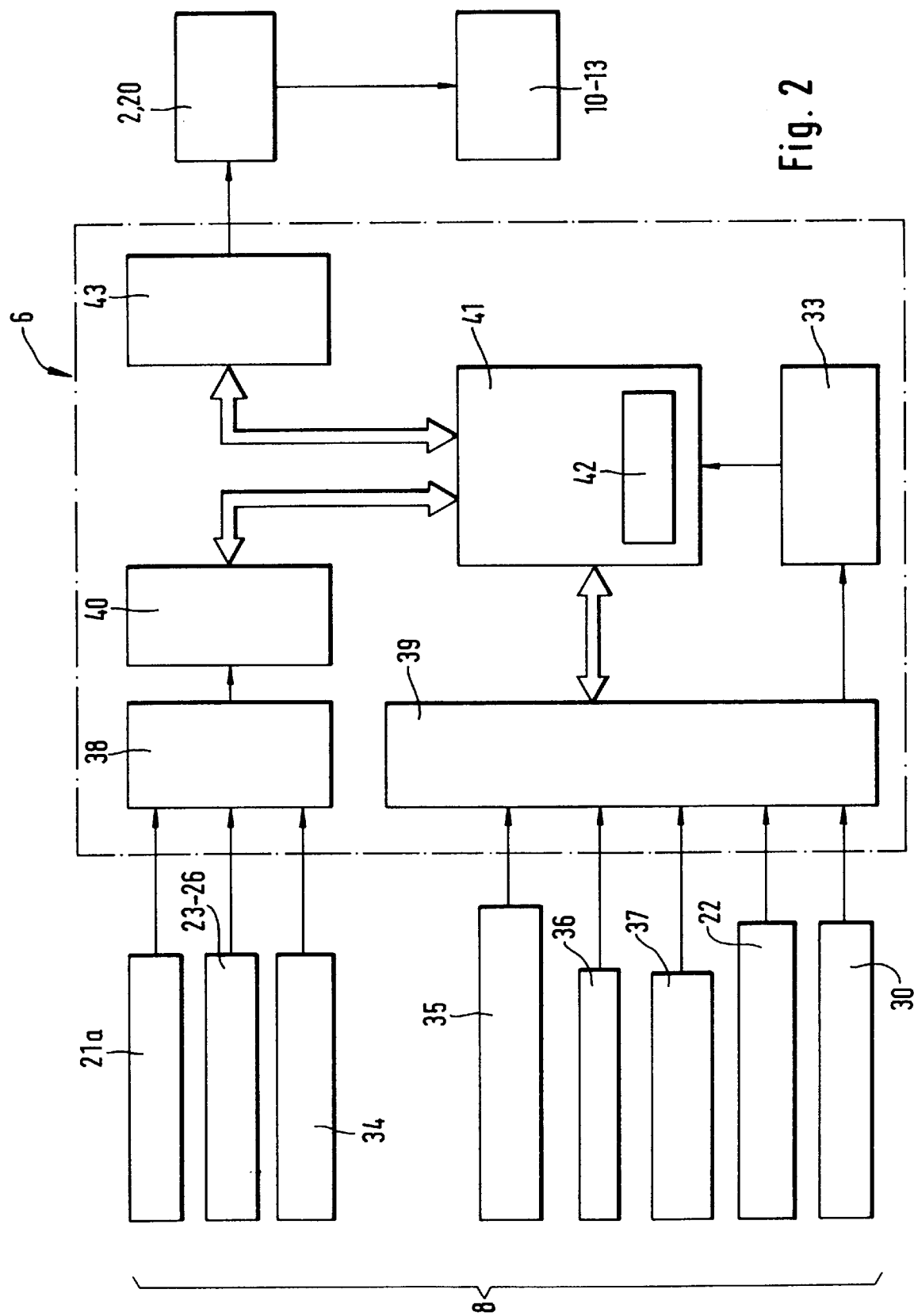
FIG. 2 is an embodiment of the electronic control unit according to FIG. 1.

FIG. 2 shows, in particular, the design of the electronic control unit 6 described previously with reference to FIG. 1. This control unit essentially contains a first and a second input interface 38, 39, an A/D converter 40 that is assigned to the first input interface 38, a microprocessor 41 with a memory 42, and an output stage 43, the output signals of which are used as trigger signals for the externally-controlled brake booster or the pre-filling pump described previously with reference to FIG. 1. For example, the analog signals of the throttle potentiometer 21a, one of the aforementioned pressure sensors 23–26 as well as a signal transmitter 34 that monitors the charge status of the motor vehicle battery are fed to the first input interface 38 as input signals and made available to the microprocessor 41 after being correspondingly processed in the A/D converter 40.

In the embodiment shown in FIG. 2, the digital signals of the previously-mentioned engine speed sensor or crankshaft speed sensor 22, the device 30, an idle switch 36 provided in non-throttled engines, a tachometer 37 that measures the motor vehicle speed, and a speed regulator 35 are fed to the second input interface 39 and forwarded to the microprocessor 41. In this case, the output signal of the speed regulator 35 serves to increase the safety of the proposed system or its shut-off. The scope of the proposed invention also includes embodiments, in which a redundant design of the electronic control unit 6 is provided. The signal of the idle switch 36 is particularly suitable for verifying the gas pedal release position and may, if so required, be linked to the microprocessor 41 by means of the aforementioned time measuring element 33 in order to carry out a plausibility check and determine the intentions of the driver.

When one or more of the aforementioned control signals are received by the electronic control unit 6, it compares the speed of the gas pedal movement that results when the actuating force is abruptly discontinued to a predetermined value stored in the memory 42. If this threshold value is not reached, a control signal is delivered to the electromagnet 20 of the brake booster 2, which is preferably controlled in analog fashion, via the output stage 43. The control of this brake booster, which is not dependent on the intentions of the driver, causes a limited pressure increase in the series-connected main brake cylinder 3. The pressure increase in the main brake cylinder 3 leads to a "pre-filling" of the wheel brakes 11–13 connected thereto and, respectively, causes the not-shown brake linings to adjoin the brake disk or brake drum. However, no deceleration of the motor vehicle takes place in this case. The time measuring element 33 determines the time elapsed between the beginning of the automatically triggered pre-filling process and the time at which the driver's foot contacts the brake pedal. If this predefined idle time is exceeded, the electromagnet 20 of the brake booster 2 is deactivated again in order to determine the driver's intention with respect to an unintentional motor vehicle deceleration. Otherwise, the pre-filling process is terminated once the driver actuates the brake pedal 4, wherein the electronic control unit 6 is informed of said process by the device 30 or the brake light switch. However, if it is determined during the aforementioned time comparison that the predetermined time value is not reached, i.e., that a very fast movement of the driver's foot from the not-shown gas pedal to the brake pedal 14 is taking place, the brake booster 2 is controlled such that a rapid pressure build-up takes place in order to assist the driver with the motor vehicle deceleration or cause a full brake application. The pressure exerted by the automatic external control of the brake booster 2 is naturally higher than the brake pressure resulting from the brake pedal position in this case.

What is claimed is:

1. Automatic brake system for motor vehicles operated by a vehicle driver, said vehicle of the type having wheel brakes that are assigned to the motor vehicle wheels, comprising:
   an electronic control unit that receives at least one control signal from a device for detecting the discontinuation of an actuating force applied on the gas pedal, the foot throttle or the twist grip throttle of the motor vehicle by the vehicle driver,
   means for ensuring pre-filling of the wheel brakes when the control signal occurs wherein the control signal represents the load status of the motor vehicle engine wherein the control signal represents at least one of a change in the presence in the intake manifold of the engine or a change in the back pressure in the exhaust system.

2. Brake system according to claim 1, wherein the control signal represents the decrease in the engine speed.

3. Brake system according to claim 1, wherein the control signal represents the motion of the gas pedal which occurs when the actuating force is discontinued.

4. Brake system according to claim 3, wherein the control signal is generated by a part of the controller for a computer-controlled automatic transmission.

5. Brake system according to claim 1, wherein the control signal is derived from performance characteristics stored in a control device of the fuel injection system.

6. Brake system according to claim 1, wherein the control signal is derived from performance characteristics stored in a control device of the engine ignition system.

7. Brake system according to claim 5, wherein a fuel injection interrupt signal is used as the control signal.

8. Brake system according to claim 6, wherein a signal which represents a spark advance angle shift is used as the control signal.

9. Brake system according to claim 2, wherein the control signal is generated by a crankshaft speed sensor.

10. Brake system according to claim 1, wherein the control signal is generated by a boost pressure sensor.

11. Brake system according to claim 1, wherein the control signal is generated by a pressure sensor.

12. Brake system according to claim 2, wherein the control signal is generated by a throttle sensor or throttle switch that detects adjustments of the throttle of the motor vehicle engine.

13. Brake system according to claim 2, wherein the control signal is generated by an idle switch that is assigned to the fuel injection pump.

14. Brake system according to claim 1, wherein said pre-filling means further include hydraulic fluid and wherein said pre-filling of the wheel brakes is accomplished by a hydraulic pre-charging pump.

15. Brake system according to claim 14, wherein said means for pre-filling the wheel brakes includes a brake booster controlled independently of the driver's intentions.

16. Brake system according to claim 15, wherein the brake booster is realized in the form of a vacuum brake booster having a control valve which is electromechanically actuated.

17. Brake system according to claim 1, wherein said electronic control unit includes means for receiving a second control signal that is generated by a device for detecting when the driver's foot contacts the brake pedal, wherein said electronic control to influence pre-filling.

18. Brake system according to claim 1, further including means for measuring the time elapsed between the beginning of the pre-filling process and the reception of the second control signal and compare the measured value to a predetermined time value.

19. Brake system according to claim 18, wherein the pre-filling process is interrupted if the predetermined time value is exceeded.

20. Brake system according to claim 18, further including means for rapidly increasing the braking pressure if the predetermined time value is not reached.

21. Automatic brake system for motor vehicles, with wheel brakes that are assigned to the motor vehicle wheels, comprising:
   an electronic control unit that receives at least one control signal from a device for detecting the discontinuation of an actuating force applied on the gas pedal, the foot throttle or the twist grip throttle of the motor vehicle by the driver,
   means for ensuring pre-filling of the wheel brakes when the control signal occurs wherein the control signal represents the load status of the motor vehicle engine wherein the control signal is derived from performance characteristics stored in a control device of the fuel injection system wherein a fuel injection interrupt signal is used as the control signal.

22. Automatic brake system for motor vehicles, with wheel brakes that are assigned to the motor vehicle wheels, comprising:
- an electronic control unit that receives at least one control signal from a device for detecting the discontinuation of an actuating force applied on the gas pedal, the foot throttle or the twist grip throttle of the motor vehicle by the driver,
- means for ensuring pre-filling of the wheel brakes when the control signal occurs wherein the control signal represents the load status of the motor vehicle engine wherein the control signal is derived from performance characteristics stored in a control device of the engine ignition system.

23. Automatic brake system for motor vehicles, with wheel brakes that are assigned to the motor vehicle wheels, comprising:
- an electronic control unit that receives at least one control signal from a device for detecting the discontinuation of an actuating force applied on the gas pedal, the foot throttle or the twist grip throttle of the motor vehicle by the driver,
- means for ensuring pre-filling of the wheel brakes when the control signal occurs wherein the control signal represents the load status of the motor vehicle engine wherein the control signal represents the decrease in the engine speed wherein the control signal is generated by a crankshaft speed sensor.

24. Automatic brake system for motor vehicles, with wheel brakes that are assigned to the motor vehicle wheels, comprising:
- an electronic control unit that receives at least one control signal from a device for detecting the discontinuation of an actuating force applied on the gas pedal, the foot throttle or the twist grip throttle of the motor vehicle by the driver,
- means for ensuring pre-filling of the wheel brakes when the control signal occurs wherein the control signal represents the load status of the motor vehicle engine wherein the control signal represents the decrease in the engine speed wherein the control signal is generated by an idle switch that is assigned to the fuel injection pump.

25. Automatic brake system for motor vehicles, with wheel brakes that are assigned to the motor vehicle wheels, comprising:
- an electronic control unit that receives at least one control signal from a device for detecting the discontinuation of an actuating force applied on the gas pedal, the foot throttle or the twist grip throttle of the motor vehicle by the driver,
- means for ensuring pre-filling of the wheel brakes when the control signal occurs said electronic control includes means for receiving a second control signal that is generated by a device for detecting when the driver's foot contacts the brake pedal further including means for measuring the time elapsed between the beginning of the pre-filling process and the reception of the second control signal and compare the measured value to a predetermined value.

26. Brake system according to claim 25, wherein the pre-filling process is interrupted if the predetermined value is exceeded.

27. Brake system according to claim 25, further including means for rapidly increasing the braking pressure if the predetermined value is not reached.

* * * * *